United States Patent Office 3,474,545
Patented Oct. 28, 1969

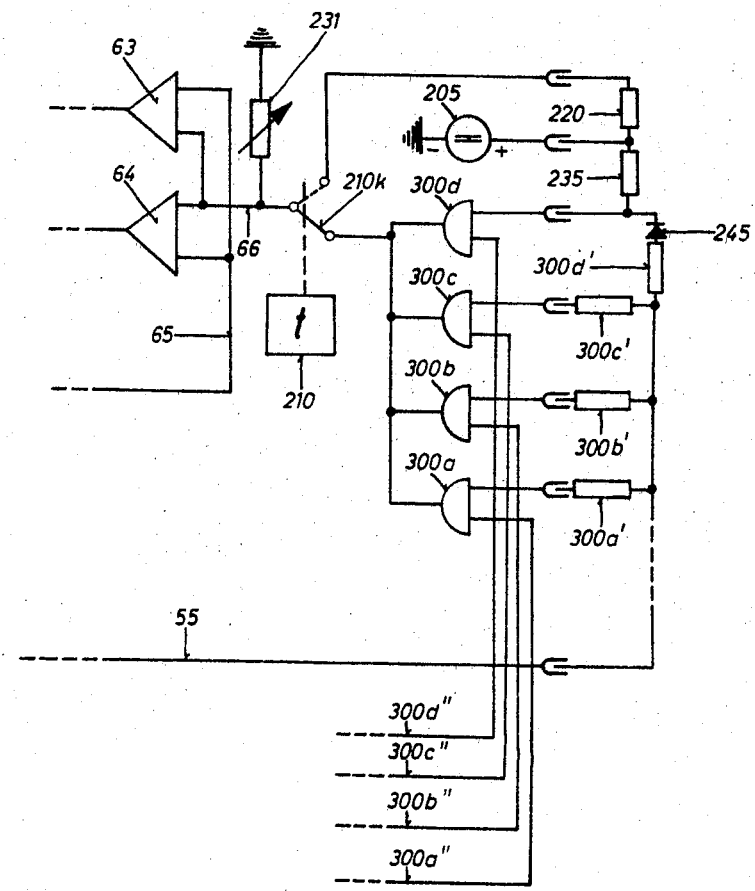
FIG.: 3

3,474,545
ARRANGEMENT FOR DRYING WET MATERIALS
Horst Klinkmüller, Stuttgart, and Friedrich Hirth, Stuttgart-Feuerbach, Germany, assignors to Gann Apparate- und Maschinenbau G.m.b.H., Stuttgart, Germany
Filed Mar. 13, 1968, Ser. No. 712,688
Claims priority, application France, Dec. 29, 1967, 134,500
Int. Cl. F26b 21/08, 3/04, 21/10
U.S. Cl. 34—45                                18 Claims

ABSTRACT OF THE DISCLOSURE

An arrangement for drying moisture containing material by passage through a processing chamber. The latter is equipped with heating apparatus and temperature regulating devices provided with input means for inserting a desired value. The moisture content of the material to be processed within the chamber is determined by moisture sensing devices. The equilibrium moisture prevailing within the processing chamber as defined by the climate of the chamber, is also measured. The moisture content of the material and the equilibrium moisture measurements are compared for the purpose of activating humidifying and drying apparatus coupled to the chamber. Through proper control of the humidifying and drying apparatus the climate within the chamber can be conditioned to the desired input values. The regulation is such that the desired input value is automatically switched between at least two temperature values whereby the temperature of the chamber is regulated as a function of the moisture content of the material.

Background of the invention

It is well known in the art to regulate the moisture of the environment within a drying chamber for drying wood material, through the use of a predetermined fraction of the prevailing moisture content as the desired input regulating parameter. The equilibrium moisture within the processing chamber is used for purposes of representing the prevailing or instantaneous parameter value. When discussing material moisture it is to be understood that the absolute moisture content of the material to be dried is intended. A volumetric average value of this moisture may also be used. The equilibrium moisture is the final value of the material moisture which prevails within the environment of the processing chamber after a substantially long period of time to which the material to be dried is subjected. The equilibrium moisture is therefore a parameter for indicating the instantaneous value or condition of the climate within the processing chamber. Accordingly, the equilibrium moisture is an indication of the drying ability when considered in relation to a particular material to be dried. The equilibrium moisture may be determined in the conventional manner through the measurement the instantaneous moisture by means of electrical conductivity measurements. The latter are carried out through uniquely designed probes or electrodes applied to the material to be dried. In order that the probe or sample moisture and the moisture of the environment within the processing chamber attain a steady state value and correspond to each other, it is essential that the surface of the probe or sample be large compared to the mass of the probe. In this manner, the time interval for achieving steady state conditions of the moisture contents is made small. The lag of the sample or probe in attaining the desired steady state value can then be essentially neglected when comparing to the variations of the moisture in the material to be dried. As a result, the moisture within the sample or probe may be made to closely correspond to the instantaneous value of the equilibrium moisture within the processing chamber. The parameter for the instantaneous or prevailing moisture content of the enviornment within the chamber is thus determined.

The comparison of this instantaneous prevailing value with the predetermined fraction of the material moisture used for regulating purposes, is accomplished in a conventional regulating circuit. The latter influences the moisture content within the chamber for the relative humidity of the chamber climate through corresponding humidity or moisture and drying instrumentation arrangements. In this manner a material moisture is progressively reduced. At the same time, the equilibrium moisture representing the climate within the chamber is in a predetermined relationship to the instantaneous prevailing material moisture. This relationship also applies to the drying gradient. This drying gradient represents a progressively decreasing material moisture which has been found to result in a rapid carrying out of the drying process when taking into consideration the properties of the material to be dried. When drying wood with this arrangement, stresses and the formation of cracks result with such savings in time for the drying process. The temperature within the processing chamber is set to predetermined values in accordance with past experience, when operating under these conditions. At the same time conventional heating arrangements are used to provide support for the temperatures set through the use of corresponding regulating means. The temperature of the processing chamber is maintained constant throughout the drying process.

During the course of carrying out investigations, it has been found that to optimize the drying process in general, it is essential to relate the temperature of the processing chamber to the reducing moisture in the material being dried. The temperature of the chamber is in one case dependent of numerous parameters, and in particular upon the properties of the material being dried. This also applies to the requirements with respect to quality control in achieving the desired dried condition. When applied especially to wood drying, the properties of the wood must be taken into account, such as stresses and cracks. Thus, the particular properties of the charge being processed and the quality of the resulting product must be taken into account so as to assure freedom from residual stresses and cracks resulting from a shortening of the drying process.

Taking into account the preceding descriptions it is accordingly an object of the present invention to provide a drying arrangement in which the temperature of the processing chamber is varied as a function of the variation in the moisture of the material being dried. This regulation of the temperature is accomplished in an automatic manner. The novel manner in which the object of the present invention is carried out resides principally in the arrangement that the desired value for regulating the temperature of the processing chamber is made dependent upon the output signals of measuring instrumentation which measures the moisture content of the material being dried. The desired value may be switched between two temperature limits in an automatic manner. The coupling of the regulating circuit for the temperature of the processing chamber with the guidance circuit for the moisture in the chamber, allows the temperature of the chamber to be related to the progressively decreasing material moisture within at least two steps. As a result the relationship between the material moisture and the set values desired for the temperature of the chamber can be fixedly or firmly determined, taking into account the properties of the material being dried. In the course of the process, furthermore, no additional circuitry is required.

In a development of the drying arrangement in accordance with the present invention, the generator which provides the desired value consists of a plurality of difference signal converters having two inputs each. The first one of these inputs is connected to the output of the measuring instrumentation for the material moisture, together with the corresponding input of the remaining signal converters or generators. The other input is connected to a respective output of a reference value generator. The signal converters are, at the same time, interconnected through means of a blocking circuit. Through the use of this blocking circuit only those signal generators transmit which have their first input associated with a predetermined measuring region corresponding to a particular signal converter. In this type of drying arrangement the entire measuring region of the material moisture may be subdivided in any number of partial measuring regions. Within such subdivided measuring regions a particular or predetermined desired value for the temperature of the processing chamber is operative. The switching of the generators for the desired value used for regulating the temperature of the processing chamber is, thereby, accomplished in an automatic manner as a function of the prevailing value of the material moisture. This is made possible through the difference signal converters in conjunction with the blocking circuit. The signal converters may be designed in the form of the basically conventional difference amplifiers with single polarity output. These difference amplifiers may be arranged so that when the difference of their inputs is of a predetermined sign, a saturated or steady state voltage is transmitted from their outputs. At the same time, no output is provided when the signal difference of their inputs are of the opposite sign. The blocking circuit for the generator providing the desired value can be designed in one embodiment, so that an AND gate is provided for each signal generator with the exception of the one associated with the AND region of the material moisture. This AND gate is provided with a normal type of input and an inverse input. The normal input is connected to the output of the associated signal converter, and the inverse input is connected to the output of a neighboring single converter.

In accordance with a particular novel embodiment of the present invention, the generator for the desired value for the temperature within the processing chamber are provided with associated signal converters having corresponding material moisture measuring regions. These regions lie within the total measuring domain and are connected in an opposite fashion so that the signals of each one of the signal converters at the outputs of the reference generators form the limit signals between neighboring material moisture measuring regions. As a result, the individual material moisture measuring regions connect to each other without any gaps in between, while the reference generator determines the limits between neighboring measuring regions through its output signals. Such a circuit arrangement permits a possibility in a simple manner to apply an individual desired value for the temperature of the chamber for each individual moisture measuring region prevailing through the entire drying process. At the same time the limits of the individual regions are matched to the different situations through the output signals of the generators for the reference values. The signal converter and the blocking circuit are joined to an interval switching circuit in an appropriate manner. The outputs of the interval switching circuit are connected to the input for the desired value of the temperature regulator by way of a matching generator.

Summary of the invention

An arrangement for drying moisture containing material such as wood. The material to be dried is passed through a processing chamber which is equipped with heating and temperature regulating apparatus. The temperature regulating equipment is provided with means for receiving an input representing the desired input value for the temperature. Through the use of moisture sensing means the moisture content of the material to be dried is measured. The equilibrium moisture prevailing within the environment or climate of the chamber is also measured. A comparator compares the measured value of the moisture content of the material, with the equilibrium moisture of the climate within the processing chamber. The output of the comparator is used to actuate humidfying and drying apparatus associated with the processing chamber to condition the climate within the chamber. The conditioning arrangement is such that the device for providing the desired input value for the temperature regulating apparatus is automatically switched between at least two desired input temperature values so as to regulate the temperature within the chamber as a function of the measurement obtained from the sensor which measures the moisture content of the material to be dried.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

Brief description of the drawing

FIG. 3 is an electrical schematic diagram of a section of the arrangement shown in FIG. 2.

Description of the preferred embodiments

Figure 1:
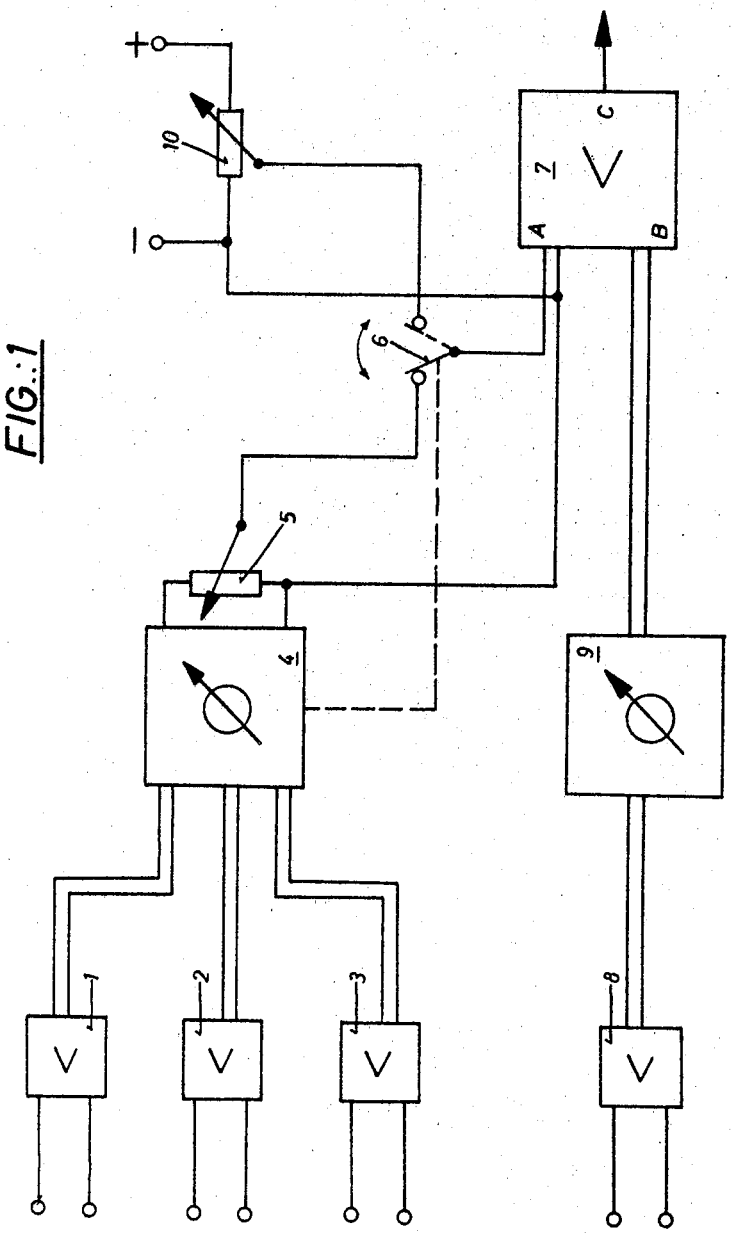
FIG. 1 is a functional schematic diagram of a regulating arrangement commonly known in the art.

Referring to the drawing and in particular to FIG. 1, the moisture of the material to be dried in the drying arrangement, is measured or sensed at three different positions of the charge or batch of the material. The sensed or measured values are transmitted to three amplifiers 1, 2, and 3 which amplify the signals from the three locations of the charge or batch and transmit the amplified values to an averaging device 4. The averaging device 4 includes a nindicating instrument. The output signal of the averaging device 4 representing the average value of the moisture content measured, is applied across a voltage divider 5. Through adjustment of this voltage divider in the form of an adjustable resistor, a portion of the signal voltage is applied to a first input A of a regulator 7. A switch 6 is connected in the path of the signal from the voltage divider 5 to the input A of the regulating device 7. The amount of the divided voltage or position of the voltage divider 5, corresponds to the drying case mentioned above.

A signal representing the equilibrium moisture of the batch within the drying chamber is applied to an amplifier 8 through a separate measuring channel. This signal from the drying chamber, not shown, is amplified by the amplifier 8 and transmitted to an indicating instrument 9 which, in turn, applies the signal to the input B of the regulator 7. The measurement of the equilibrium moisture is accomplished in the conventional manner as described above, through determining the electrical conductivity of a sample of the batch having a relatively large surface. In the case of drying of wood, a thin shaving of the wood to be dried is selected.

The regulator 7 performs a comparison between the inputs A and B. The latter represents the prevailing moisture content, whereas the input A represents the desired amount of moisture determined by the setting of the adjustable resistor or voltage divider 5. The regulator 7 develops a positioning signal at its output C for the purpose of exercising the relating functions. Depending upon the magnitude of the signal at the outputs C and its relationship to prescribed or preset limits, the output signal of the regulator 7 will switch on or off humidifying or drying apparatus for regulating the climate within the chamber where the batch is located. Thus, one or the other type of apparatus will be activated within the processing chamber depending upon whether the signal at the output C is above or below predetermined limits.

The averaging device 4 has a mechanical linkage between it and the switch 6, shown in the drawing by means of a dashed line. When the indicated value of the averaging device 4 attains a predetermined limit, the switch 6 is actuated through the linkage of the dashed line, so as to connect the input A of the regulator 7 to the voltage output of the adjustable resistor 10. When the switch 6 is in the position indicated by dashed lines, whereby the input A of the regulator 7 is connected to the device 10, the desired value against which the input B is compared, remains constant and independent of the prevailing humidity. When the switch 6 has been transferred to the position indicated by the dashed line in the drawing of FIG. 1, the fixed input is applied to the device 7 corresponding to a predetermined limit of the prevailing moisture, and as a result a corresponding conditioning process is carried out within the process chamber. In conventional drying arrangements the temperature of the process chamber is set manually and is independent of the moisture regulation.

Figure 2:
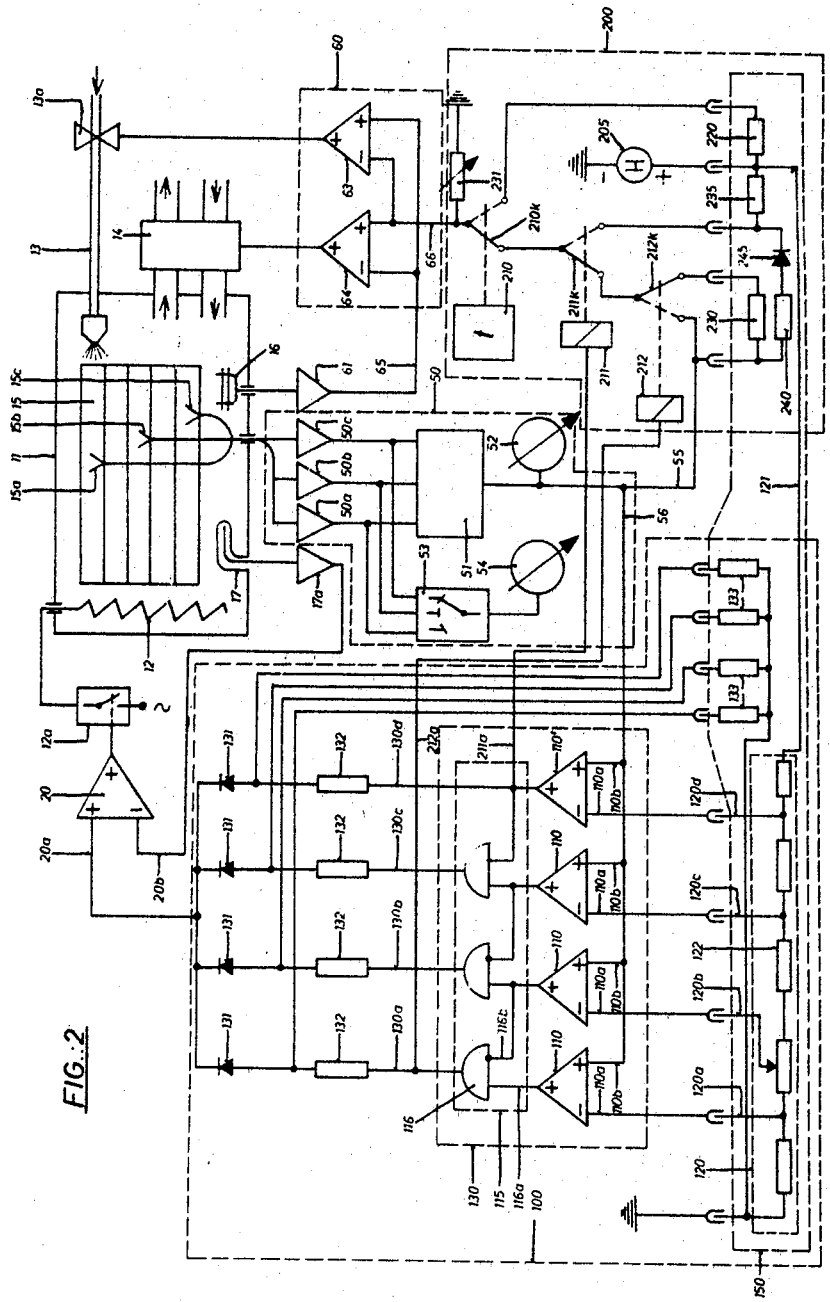
FIG. 2 is a functional schematic diagram of a complete wood drying arrangement, in accordance with the present invention and shows the functional elements as well as their interrelationships for accomplishing the objects of the present invention.

The arrangement of the present invention as shown by the electrical schematic diagram of FIG. 2, operates in conjunction with a drying chamber 11 which has a heating installation 12, a humidifying installation 13, and a drying installation 14, all for the purpose of conditioning the environment within the chamber. For illustrative purposes, the heating arrangement is shown in electrical form with a control switch 12a. The humidifying installation is represented by a spray nozzle communicating with a control valve 13a for purposes of adjusting the amount of fluid conducted to the nozzle. The drying installation 14 operates in the conventional manner as an air circulator whereby dry external air forced into the chamber and the humid interior air of the chamber is sucked out.

A charge 15 is illustrated within the drying chamber or process chamber. This charge or batch may for example be a wood charge which is spatially subdivided for the locations of conductivity sensors 15a, 15b and 15c. These sensors detect and transmit signals corresponding to the prevailing moisture at the locations sensed. The process chamber, furthermore, includes a measuring instrument 16 mounted near a thin wood shaving for the purpose of measuring the moisture equilibrium within the chamber. The latter also contains an electrical temperature sensor 17 operating on the thermo-electric principle.

The signals from the humidity sensors 15a, 15b and 15c are transmitted to a humidity measuring arrangement 50 operating in conjunction with the process chamber. Other regulating equipment for the chamber includes a humidity regulator 60 operating in conjunction with a programmer 200 and a temperature regulator 20 operating in conjunction with the arrangement 100 which applies the desired value to the temperature regulator. The humidity measuring instrumentation provides, by way of the programmer 200 a signal to the humidity regulator 60, representing the desired value. At the same time, the humidity measuring instrumentation controls the desired input value device 100 for the temperature regulator 20.

In what follows the construction and operation of the humidity regulator 60 and the programmer 200 is described in conjunction with the humidity measuring installation. After that the construction of the arrangement 100 for the temperature regulation and its manner of operation with respect to the humidity measuring instrumentation is illustrated.

Within the humidity measuring instrumentation 50 are three measuring channels leading from the sensors 15a, 15b and 15c. These channels terminate in three amplifiers 50a, 50b and 50c, each providing an output to an averaging device 1. The output of the averaging device furnishes the average value of the humidity sensed by the sensors 15a, 15b and 15c, and applies the signal representing this average value to an indicating instrument 52. The three measuring channels stemming from the sensors 15a, 15b, and 15c can also each be individually connected to a further indicating instrument 54 by means of the switch 53. The latter has provision for selectively connecting each individual output from the amplifier 50a, 50b and 50c to the input of the indicating device 54. The indicating instrument 54 houses the detection of a measured value which deviates excessively from the average value, and thus corrective steps may be taken accordingly. The averaging device 51 transmits from the output of the humidity measuring instrumentation 50, a signal along the path 55 leading to the programmer 200. At the same time this output is also applied through the path 56 to the arrangement 100 which provides for the temperature regulation.

The humidity or moistures regulator 60 consists of two difference amplifiers 63 and 64 each having a unipolar output. When the difference of the input signals has a preselected sign associated with it, a predetermined output is provided by the amplifiers. When, on the other hand, the signs associated with the difference of the input signals is opposite to that selected, no output signal is provided. In the electrical schematic diagram of FIG. 2 such unipolar difference amplifiers are used in several places, and are represented similarly to that shown for the amplifiers 63 and 64. These difference amplifiers are to be looked upon as special designs of difference signal converters.

Within the moisture regulator 60, the inputs of the difference amplifiers 63 and 64 are connected such that the negative marked input of the unit 63 is connected to the positive marked input of the unit 64. At the same time, the positive input of the amplifier 63 is connected to the negative input of the amplifier 63. Thus, terminals of opposite polarity are joined together. The output of the programmer 200 is, furthermore, connected to one set of the terminals through the connecting lead 66. Through the connecting path 65, the amplifiers 61 applies a signal to the difference amplifier 63 and 64, which represents the moisture equilibrium prevailing within the processing chamber. The programmer 200, on the other hand, provides a signal to the connecting path 66, which represents the magnitude of the desired equilibrium moisture corresponding to the moisture which is desired to be prevalent within the processing chamber. In view of the interconnections of the opposite polarity terminals of the difference amplifiers, the amplifier 63 provides an operative output only when the prevailing equilibrium moisture within the chamber drops below a predetermined set limit. The difference amplifier 64 on the other hand provides an operative output only when the equilibrium moisture exceeds a predetermined upper limit. In accordance with these operating conditions of the amplifiers, the humidifying arrangement 13 and the drying installation 14 become operative depending upon whether the prevailing equilibrium moisture within the processing chamber is below or above predetermined limits, respectively.

The desired value for the moisture regulation provided by the programmer 200, is derived from the output signal on line 55 of the moisture measuring instrumentation 50. The derivation of this desired value is made in a different manner depending upon the different sequential phases of the drying process. The program control of the desired value for the moisture regulation is accomplished with the aid of a time relay 210 and two further relays 211 and 212.

These last two relays are controlled, in a manner to be described, by the temperature regulator arrangement 100 through the control lines 211a and 212a as shown in the schematic diagram of FIG. 2. The construction and operation of the programmer 200 will be described for a middle section of the drying process. During this section of the process the relationship between the equilibrium moisture and the moisture prevailing in the material to be dried remains substantially constant. During this operating phase the switching states of the relays 210, 211 and 212 correspond to the states shown in FIG. 2. Thus, the switching contacts 210k, 211k, 212k are in the positions shown in the drawing of FIG. 2 during this particular operating phase. The DC voltage appearing as the output signal at the path 55 of the moisture measuring instrumentation 50, is transmitted to a voltage divider comprised of resistors 230 and 231. The transmission of the signals through this voltage divider is accomplished through the switching contacts 210k, 211k and 212k. The resistor 231 is provided in the form of a variable resistor for making possible adjustments in the drying process. The input 66 of the humidity regulator is directly connected to the junction of resistors 230 and 231 of the voltage divider. By being connected through the top of the voltage divider in this manner, the signal path 66 provides the desired value for the humidity regulation in the drying process. As a result, a section of the drying process is obtained during which the regulating procedure corresponds to FIG. 1. Under these conditions the equilibrium moisture determined by the environment within the processing chamber stems from the producing moisture content of the material to be dried.

The temperature prevailing within the processing chamber is sensed by the temperature sensor 17. The signal provided by this sensor is amplified through the instrument amplifier 17a and applied to the input 20b of the temperature regulator 20. The other input 20a of the temperature regulator 20 receives the desired value of the temperature which is to be present within the chamber. The circuit 100 which provides the value of the temperature desired within the processing chamber, is required to supply a varying number of such desired chamber temperature values throughout different intervals of the drying process applied to the material within the chamber. For this purpose, the circuit 100 includes a reference signal generator 120 and an interval switching arrangement 130. The circuits 120 and 130 cooperate so as to subdivide the entire moisture region of the material to be processed into a predetermined number of intervals. The reference circuit 120 is essentially a signal generator having a plurality of outputs which provide limit signals for the subdividing process. The interval switching arrangement 130 has a plurality of inputs corresponding to the outputs of the signal generator 120 and, at the same time provides a plurality of outputs each one corresponding to a predetermined interval. A signal representing the moisture content of the material within the chamber is also applied as a control signal to the interval switching arrangement. The plurality of outputs of the interval switching arrangement applied to the input 20a of the temperature regulator 20 the desired temperature value corresponding to the individual moisture regions are determined by the associated detection generators. These outputs of the interval selector or switching arrangement are also used for the purpose of controlling the programmer 200. In this manner the different moisture regions of the material to be processed within the chamber, can be supplied, as required with the different parameters or values applicable to a particular drying process or situation. The manner of operation of the functional groups of circuits, in accordance with the present invention will now be described in detail for purposes of illustration.

The reference signal generator 120 is comprised of a plurality of voltage dividers arranged in the form of a cascade of resistors. A high voltage source applies a DC voltage to the cascade of resistors by means of the connecting path 121. The other end of the cascade or chain of resistors is connected to ground potential. The high voltage source 205 is located within the programmer 200 and supplies, in addition a number of other generators for providing the desired values in the moisture regulating process. The reference signal generator 120 has four outputs 120a, 120b, 120c and 120d. These outputs consist of the taps taken at the junctions of the individual resistors in the cascade or chain. The output 120b is connected to the sliding contact of a potentiometer 122 used as a voltage divider element. The outputs 120a, 120c, and 120d provide predetermined limiting signals for the subdivision of the intervals through predetermined and fixed scaling of the voltage divider. Whereas the output voltages or signals from the outputs 120, 120c and 120d are fixed, the output 120b provides an adjustable limiting signal. As a result, it is possible to realize a fixed subdivision arrangement for the programming or an arrangement which is adjustable. Aside from this, the reference signal generator 120 is provided with plug-in connectors whereby a still further varying selection of intervals may be obtained when taken in conjunction with other programming elements to be described.

The interval switching circuit 130 is comprised of, for example, for difference amplifiers having an output of singular polarity. Three of these four amplifiers are designated by the reference numeral 110 whereas the fourth difference amplifier is designated by 110'. The inputs 110b which are the same for all four difference amplifiers, are connected together and joined to the moisture measuring instrumentation 50 through the circuit path 56. The other inputs 110a also the same for all four amplifiers are connected to the corresponding outputs 120a, 120b, 120c and 120d of the reference signal generator 120. As a result, each difference amplifier is provided with one input having applied to it a moisture signal, and a second input to which a limit signal is applied from the limit signal generator 120. The difference amplifiers are designed so that each one will provide an output only when the signal input 110b exceeds the magnitude of the signal 110a. This condition is represented by the sign convention indicated on each amplifier. The design and construction of such difference amplifiers is well known in the art and will not be described in detail further. In accordance with this particular circuit design and arrangement, each difference amplifier provides an output only when the signal representing the moisture of the material within the chamber exceeds the value of the signal representing the limit value.

For purposes of describing the difference amplifiers 110 and 110' in greater detail, the positive and negative markings at the inputs of these amplifiers designate a polarity of the corresponding signals applied to the inputs. The polarity is used to obtain the difference values. By connecting the DC voltage source 205 in the manner shown on the drawing, it may be seen that the signals at the outputs 120a to 120d inclusive are of positive polarity. At the same time the moisture signal transmitted along the circuit path 56 is also of positive potential. During the course of the drying process it may be seen that the voltage potential at the inputs 110d, representing the material moisture, will decrease with respect to the voltage potential at the output 120d representing the value of the highest limit. As the drying process progresses the material moisture signal drops below the limit value at the output 120d, and as a result only the outputs of the difference amplifiers 110 still prevail. In a similar manner, the material moisture signal drops, during the course of the drying process below the limit values of the outputs 120c, 120b and 120a. This last limit corresponds to the predetermined final value of the material moisture. It may be seen from this that the limiting signals at the outputs 120d to 120a represent the lower limit in this sequence of material moisture regions.

As described above, each differential amplifier 110 and 110' has an output signal whereby the limit is below the instantaneous value of the material moisture. With respect to the lowest moisture region, a number of these amplifiers have output signals. In order to provide a unique arrangement or relationship between the moisture region and the output signal of a particular difference amplifier, a blocking of amplifiers is required. In this configuration the output signal of the amplifier representing the highest limit only would be transmitted, whereas the remaining amplifier outputs would be blocked. Such a blocking circuit 115 is provided, for this purpose, at the outputs of the difference amplifiers 110 and 110'. The blocking circuit 115 includes an AND gate 116 for each one of the three difference amplifiers 110. Each one of the AND gates 116 has a normal polarity input 116a and an inverse or inverted input 116b. The normal input of each one of the AND gates is connected to the output of the associated difference amplifier 110. The inverse input of any one of the three AND gates is, on the other hand, connected to the output of the difference amplifier associated to the next highest limit taken in sequence. The three lower outputs 130a, 130b, and 130c of the interval switching circuit 130, result from the outputs of the AND gates 116. The highest or largest output 130d of the interval switching arrangement corresponds to the output of the difference amplifier 110'. This circuit arrangement is such that the output signal of any difference amplifier functions to plug the output of the neighboring amplifier associated with a lower value. As a result, only that output signal is transmitted from the interval switching circuit, which is associated with the difference amplifier of the highest limiting signal. Therefore, an output is derived only from that difference amplifier which is associated with the measuring region in which the instantaneous prevailing moisture lies.

An individual generator is connected to each one of the outputs 130a to 130c of the interval switching arrangement 130. The generator is comprised of an upper resistor 132 and a lower resistor 133. The junction of the two resistors provides a voltage signal representing the desired value of the material moisture region. The taps or junctions of the generators are also connected together after passage through the coupling diodes 131. Thus, the outputs of the coupling diodes 131 are all joined together and applied to the input 20a of the temperature regulator 20. The lower resistors 133 of the generators, may be interchanged through the use of plug-in connectors. These resistors are arranged in a programming plug board 150 together with the reference signal generator 120. In particular cases or situations the individual generators comprised of resistors 132 and 133 may also be arranged in the form of adjustable resistors.

For each one of the material moisture regions indicated and selected by the outputs of the interval switching arrangement 130, parameters other than temperature can be regulated in a sectional and programmed manner. In FIG. 2, for example, two such program controls are provided for the moisture regulation. These are a switching on of a particular desired value circuit in the upper material moisture region, and the transfer of the drying parameter to unity value when the prevailing material moisture drops below a predetermined limit. Such a limit, may, for example, be the limiting signal at the output 120b of the reference signal generator 120. In conjunction with this arrangement the control path 211a of the relay 211 is connected to the output 130d. The control path 212a of the relay 212, on the other hand, is connected to the output 130a of the interval switching circuit. Thus, the relay 212 is energized when the value of the limit signal at the output 120b of the reference signal generator 120 is not exceeded. Accordingly, the energizing of the relay takes place when the predetermined limit of the material moisture has been attained, or the lowest measuring region is initiated. This lowest measuring region becomes associated with the particular drying process, and a conditioning procedure is applied within this region.

The controlling operation of the interval switching arrangement 130 and the functional operation of the programmer 220 is as follows: In an initial phase of the drying process, such as a heating period, the moisture regulation is determined through the timing relay 210 in conjunction with the switching contact 210k. During this drying phase, this switching contact 210k assumes the position shown by the dotted lines in FIG. 2. At the input 66 of the desired value for the moisture regulator 60, a desired value generator becomes operative. This desired value generator is comprised of an upper resistor 220 and a lower resistor in the form of an adjustable unit 231. The voltage supply 205 energizes this voltage divider. During this drying phase, therefore, the climate within the processing chamber is regulated to a predetermined equilibrium moisture. With regard to the moisture of the material, the drying phase lies within that of the difference amplifier 110' of the interval switching circuit 130, corresponding to the upper measuring region. The desired value for the temperature within the processing chamber is thereby determined. Deviating from this arrangement possible, it is of course, also possible to apply a particular desired value for the temperature of the processing chamber at the input 20a of the temperature regulator 20 with the aid of the timing relay 210.

With the expiration of the heating period determined through the timing device or relay 210, the generator for the desired value 220, 231 becomes disconnected as a result of the state of the switching contact 210k. During this circuit state the material moisture is still within the uppermost measuring region in which the relay 211 is energized as a result of the output 130d of the interval switching arrangement 130. At the same time, the switching contact 211k is in the position opposite to that shown in the drawing of FIG. 2. In this position the switching contact 211k is in the state shown by the dashed line in the drawing. When the desired value for the temperature of the processing chamber remains unchanged, another generator for the desired value of the moisture regulation is connected into the circuit. The latter is comprised of two voltage dividers connected in parallel each having an upper resistor 235 and 240. The adjustable resistor 231 is used as the lower resistor for both of these voltage dividers. The upper resistor 235 has the voltage supply 205 applied to it. The upper resistor 240, has, on the other hand, applied to it the positive material moisture signal from the output of the moisture measuring instrumentation 50. This positive potential is applied to the resistor 240 by means of the circuit path 55. In this manner, a resulting desired value is provided at the input 66 of the humidity regulator. This resulting desired value is determined through the superposition of a constant signal upon a fraction of the material moisture signal. The progress of the drying process is slowed down through the comparison of the desired value with the material moisture signal. Such an intermediate phase is, for example, applicable in the case of wood drying.

When dropping below the lower limit of the uppermost moisture measuring region, the output 130d of the interval switching circuit 130 becomes disconnected. As a result, the relay 211 becomes deenergized and the switching contact 211k returns to its lower or unactuated state. At the same time the switching contact 212k assumes its upper position until the output 130a of the interval switching circuit is connected. This corresponds to the attainment of the final value of the material moisture. The desired value for the moisture or humidity is consequently determined as described above, through the said circuit path 55 from the output of the moisture measuring instrumentation and the generator comprised of resistor 230 and adjustable resistor 231 fed by the moisture measuring instrumentation. The equilibrium moisture for the material moisture is thereby obtained in the middle section of the drying process as mentioned above with regard to the drying situation involving the generator 230/231. The desired value for the temperature of the processing chamber becomes determined during this middle section through the outputs 130c and 130b.

When dropping below the predetermined final value of the material moisture, the output 130a of the interval switching circuit becomes connected into the circuit and the relay 212 becomes energized through the circuit path 212a. As a result, the switching contact 212k assumes its operative position. The output of the moisture measuring instrumentation 50 becomes thereby connected to the input 66 of the moisture regulator through the path 55, switching contacts 212k, 211k and 210k. The operating drying situation or configuration is thereby switched to the value of unity, whereby the equilibrium moisture becomes regulated to the attained final value of the material moisture which remains constant therewith. As a result, the actual drying process is terminated. At the same time the output 130a of the interval switching circuit switches on the predetermined and desired value for the temperature of the processing chamber.

The resistors 220, 230, 235, and 240 used to provide the different desired values for the moisture are comprised of a circuit in which the resistors are made interchangeable. These resistors are also contained within the programming plug board 150 described above for containing the resistors 133 for the desired value of the chamber temperature, and the reference signal generator 120. This plug board 150 also includes the decoupling diode 245 connected in series with the resistor 240. This decoupling diode 245 prevents any back effects of the voltage supply 205 upon the desired value for the moisture when the relay 211 is deenergized. This corresponds to the condition when the switching contact 211k is in its lower position. The programming plug board 150 therefore contains all of the circuit elements required for the determining the different desired values and limit signals. With this arrangement all of the elements for determining a particular program taken into the different parameters for a particular drying process, are contained together in one circuit component. At the same time, the programming plug board includes resistor circuits which are not of a complex arrangement, so that different requirements for different materials to be dried and associated processes may be realized with ease through the programming storage.

In accordance with the present invention it is possible in a simple manner to designate a particular value for the drying gradient within the processing chamber through the interval switching circuit 130 which determines the moisture region being measured. This procedure which applies only to the programmer 200 may be seen in FIG. 3. The elements of the electrical circuit shown in FIG. 3 correspond directly to those in FIG. 2 with the same reference numerals, and all matter discussed in relation to these elements in FIG. 2 also apply in FIG. 3. In the place of relays 211 and 212, a cascade of AND circuits 300a, 300b, 300c, and 300d are provided with which one having two inputs. One of each of these inputs to the AND gates is provided with the desired value from a generator 300a', 300b', 300c' and 300d'. The other input to each of the AND gates is connected to an associated output of the interval switching circuit through the circuit path 300a", 300b", 300c" and 300d". With this arrangement the drying gradient may be sectionally matched to the progressive drying process. It is also possible through these means to realize an optimum process run in the more difficult situations. Furthermore through use of an interval switching circuit with a large number of steps of subdivisions, the material moisture regions may may be finely divided as desired in a sequence of intervals. With such finely subdivided intervals, it is possible then to approximate the process to a continuously changing programming run.

The embodiments described above in relation to the invention, are based upon a DC analogue computing circuit or DC logical circuit arrangement. It will, however, be understood that the regulating circuit in accordance with the present invention may also operate basically with other types of signal transfer circuits and functional elements as, for example, AC or pulse modulated signal transmission as well as their associated amplifiers and computing elements.

It will be understood that each of the elements described above, or two or more together, may also find a useful application in other types of material drying arrangements differing from the types described above.

While the invention has been illustrated and described as embodied in a material drying apparatus, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitute essential characteristics of the generic or specific aspects of this invention and, therefore, such adaptations should and are intended to be comprehended.

What is claimed as new and desired to be protected by Letters Patent is set forth in the appended claims:

1. An arrangement for drying moisure containing material comprising, in combination, process chamber means; heating means for heating the interior of said chamber means; temperature regulating means connected to said heating means and having input means for insertion of a desired value for regulating the temperature within said chamber; material moisture measuring means for measuring the moisture of said material; equilibrium moisture measuring means for measuring the equilibrium moisture prevailing within said chamber; comparison means connected to said material moisture measuring means and said equilibrium moisture measuring means for comparing the measured values therefrom; and humidifying and drying means controlled by said comparison means for conditioning the climate within said chamber, whereby said input means is automatically switched between at least two desired input temperature values for regulating the temperature of said chamber as a function of the measurement from said material moisture measuring means.

2. The arrangement for drying moisture containing material as defined in claim 1, wherein said input means comprises a plurality of signal difference evaluating means each having two inputs.

3. The arrangement for drying moisture containing material as defined in claim 2, including reference signal generator means connected to one of said two inputs of said signal difference evaluating means, the other one of said two inputs of said difference evaluating means being connected to the output of said material moisture measuring means; and blocking circuit means connected to said signal difference evaluating means for blocking transmission from said difference evaluating means other than that one associated with a predetermined region within the range of moisture content of said material.

4. The arrangement for drying moisture containing material as defined in claim 3, wherein said signal difference evaluating means each have a single polarity output appearing only when the difference between the signals measured is of a predetermined sign.

5. The arrangement for drying moisture containing material as defined in claim 4, wherein said signal difference evaluating means comprises difference amplifiers having single polarity outputs.

6. The arrangement for drying moisture containing material as defined in claim 5 including an AND gate in said blocking circuit means for each of said signal evaluating means other than the one associated with the end region of the range of moisture within said material, said AND gate having a normal input connected to the output of the corresponding signal difference evaluating means and having an inverse input connected to the output of a neighboring signal difference evaluating means.

7. The arrangement for drying moisture containing material as defined in claim 6, wherein said reference signal generator means comprises a resistor circuit having output terminals connected to said signal difference evaluating means.

8. The arrangement for drying moisture containing material as defined in claim 7, including connecting means for interchangeably connecting said resistor circuit means.

9. The arrangement for drying moisture containing material as defined in claim 8, including means for providing at least one adjustable output from said reference signal generator means.

10. The arrangement for drying moisture containing material as defined in claim 9 including interval switching circuit means connected to said signal difference evaluating means and said blocking circuit means, the outputs of said interval switching circuit means being connected to said input means of said temperature regulating means.

11. The arrangement for drying moisture containing material as defined in claim 10 including signal matching means connected between said input means and the outputs of said interval switching circuit means.

12. The arrangement for drying moisure containing material as defined in claim 11, wherein said signal matching means comprises voltage dividing means with decoupling circuit means.

13. The arrangement for drying moisture containing material as defined in claim 12 including further connecting means and resistor means within said voltage dividing means, said further connecting means interchangeably interconnecting said resistor means.

14. The arrangement for drying moisture containing material as defined in claim 13 including programming means connected to said material moisture measuring means for regulating the moisture within said chamber.

15. The arrangement for drying moisture containing material as defined in claim 14, including input generating means at the output of said programming means and in dependence of the measurement from said material moisture measuring means.

16. The arrangement for drying moisture containing material as defined in claim 15, wherein said input signal generator means comprises a resistor circuit means having adjustment and interchanging means.

17. The arrangement for drying moisture containing material as defined in claim 16 including signal matching means connected to said programming means and controlled as a function of the moisture in said material.

18. The arrangement for drying moisture containing material as defined in claim 17 including plug board means for containing said reference signal generator means and said signal matching means associated with said programming means, whereby humidity regulation is realized through predetermined programming of said plug board.

References Cited

UNITED STATES PATENTS 3,269,715   8/1966   Wellford _____ 34—46
3,430,357   3/1969   Perry _____ 34—16.5

JOHN J. CAMBY, Primary Examiner